United States Patent
Cook et al.

(10) Patent No.: US 7,921,767 B2
(45) Date of Patent: Apr. 12, 2011

(54) AUTOMATIC BROILER FOR VARIABLE BATCH COOKING

(75) Inventors: Jeffrey R. Cook, Coral Springs, FL (US); Robert J. Wenzel, Port Richey, FL (US); Mark Finck, Davie, FL (US); Steven M. Shei, Flort Wayne, IN (US); Clement J. Luebke, Essex Jct., VT (US)

(73) Assignee: Burger King Corporation, Miami, FL (US)

( * ) Notice: Subject to any disclaimer, the term of this patent is extended or adjusted under 35 U.S.C. 154(b) by 769 days.

(21) Appl. No.: 11/899,912

(22) Filed: Sep. 7, 2007

(65) Prior Publication Data

US 2008/0141868 A1 Jun. 19, 2008

(51) Int. Cl.
*A47J 37/04* (2006.01)
(52) U.S. Cl. ......... 99/328; 99/329 R; 99/329 P; 99/332; 99/335; 99/386; 99/391; 99/443 C; 219/398
(58) Field of Classification Search ............ 99/326, 99/327, 328, 329 R, 329 P, 331, 332, 334, 99/335, 386, 389, 391, 443 C; 126/21 A; 219/395, 396, 398
See application file for complete search history.

(56) References Cited

U.S. PATENT DOCUMENTS

| | | | | |
|---|---|---|---|---|
| 4,368,664 A | * | 1/1983 | Smith et al. | 99/386 |
| 4,421,015 A | * | 12/1983 | Masters et al. | 99/332 |
| 4,655,126 A | * | 4/1987 | Wells | 99/386 |
| 4,924,767 A | | 5/1990 | Stuck | |
| 4,951,648 A | * | 8/1990 | Shukla et al. | 126/21 A |
| 5,253,564 A | * | 10/1993 | Rosenbrock et al. | 99/328 |
| 5,560,349 A | | 10/1996 | Lucero | |
| 5,640,896 A | * | 6/1997 | Stuck | 99/391 |
| 5,727,451 A | | 3/1998 | DeMars | |
| 5,746,116 A | | 5/1998 | Smith | |
| 6,570,136 B1 | | 5/2003 | Lockwood et al. | |
| 6,817,283 B2 | * | 11/2004 | Jones et al. | 99/386 |
| 6,867,392 B1 | | 3/2005 | Howard | |
| 7,038,172 B1 | | 5/2006 | Stuck | |
| 2004/0020915 A1 | | 2/2004 | Shei | |
| 2004/0069155 A1 | | 4/2004 | Shei | |

* cited by examiner

*Primary Examiner* — Reginald L Alexander
(74) *Attorney, Agent, or Firm* — Arent Fox LLP

(57) ABSTRACT

A flexible automatic broiler and method of use for variable batch cooking for particular use in quick serve and fast food service restaurants. The automatic cooking devices include a conveyorized cooking surface for alignment and discharge of food products, an altering/pulsating infrared energy radiation heat sources, and a control system. The arrangement and method facilitate a combination of batch preparation and made-to-order assembly of fast-food sandwiches.

15 Claims, 13 Drawing Sheets

COOK PROGRAM FUNCTION
DIAGRAM
NON-PERIODIC

A & C : LENGTH OF ON TIME FOR TOP IR HEAT
B & D : LENGTH OF OFF TIME FOR TOP IR HEAT
E : TOTAL COOK CYCLE TIME

A,B,C,D; CAN BE PROGRAMMED TO ANY
TIME. ADDITIONAL PERIODS OF ON AND
OFF TIME CAN BE ADDED.

E; THE SUM OF ALL ON AND OFF TIMES
IN THE COOKING PROGRAM under the title US 7,921,767 B2

AUTOMATIC BROILER FOR VARIABLE BATCH COOKING

FIELD OF THE INVENTION

The present invention relates to automatic broilers for variable batch cooking. The automatic broilers of the present invention have particular use in quick serve and fast food service restaurants. More particularly, the present invention relates to flexible automatic broilers for broiling batches of various food products by utilizing a radiant burner below the broiled food product and by altering the infrared energy radiated from a heat source above the broiled food product.

BACKGROUND OF THE INVENTION

Conveyorized chain cooking of various foodstuffs is known in the fast-food industry. Typically, conveyorized chain cooking devices comprise a continuously moving conveyorized cooking surface displaced adjacent to heating elements. Such conveyorized chain cooking devices allow for the continuous sequential cooking of food products such as beef patties and thus accommodate high demand periods in fast food restaurants. Conveyorized cooking devices also increase the efficiency of kitchen operations by uniformly cooking similar food products without continuous attention from the cook.

Such conveyorized chain cooking devices, however, have significant disadvantages such as an inability to quickly and efficiently change the cooking profile such that the device is capable of uniformly cooking one individual food product or batch of food products and then subsequently uniformly cooking a different product or batch of products. For example, conveyorized chain cooking devices have been unable to quickly and efficiently change the thermal output of the heat sources to properly cook different types of meat or different sizes of product.

U.S. Pat. No. 4,924,767 teaches a conveyorized cooking device with variable-load, low-thermal-mass heating elements to accommodate different food products. These heating elements allow for quick cooling of the cooking zone to prevent burning of subsequently cooked foodstuffs. Disadvantageously, however, thermal energy is wasted. As a result of the conveying motion and variable-loads, the heater elements do not continuously and uniformly radiate heat directly onto the food products. Further heat is wasted due to the lack of an enclosed cooking area. Additionally, only electric heating elements are disclosed and thus the problems of providing for varying cooking loads to accommodate different food products using gas burners or flame broiling are not addressed.

Typical conveyorized cooking devices suffer from additional problems. For example, while such devices allow for continuous sequential cooking of foodstuffs, kitchen operations efficiency is not maximized. Batch loading is not facilitated. Instead, an operator must insert individual products at the entry end of the conveyor cooking surface. Additionally, the constant motion of the conveyor cooking surface and the associated drive train components makes such devices hard to clean, difficult and expensive to maintain (in terms of parts, labor and downtime) and more susceptible to breakage. Furthermore, such devices typically do not involve a completely enclosed cooking chamber, thus facilitating entry of debris and loss of thermal efficiency.

Still other problems exist with the respect to typical, conventional, control systems. These known control systems, such as thermostats, control temperature regulation in the cooking device. Conventional controls rely on a feed-back loop system that leads to problems, particularly during the cooking process, including inaccurate cooking temperature and temperature gradients. As a result, the cooked products may be undercooked or overcooked, thus reducing the quality of the finished product. Further, typical cooking devices fail to distinguish between different heating stages, such as pre-heat from cold, pre-heat from hot, cooking, or idle stages. In addition, typical cooking devices fail to of maximize the efficiency of the device when operating in these stages or when transitioning between such stages.

Still further problems exist with control systems associated with conveyorized cooking devices such as the one shown in U.S. Pat. No. 4,924,767. There, the cooking device is controlled solely by a thermostat device. This results in various problems including inaccurate cooking temperature and temperature gradients leading to a poor quality finished product. These problems are compounded by the conveyorized nature of the device and its use in a commercial environment. Moreover, the disclosed controller cannot be programmed, cannot conduct a system check or detect system faults, cannot keep track of statistical data, and does not provide audio or visual system status indications.

As the skilled artisan will readily appreciate, there is a difference between broiling and baking. Broiling typically requires cooking temperatures of approximately 500° F. or more. Additionally, broiling involves an initial searing action to lock in juices and flavor. As a result, the cooked product is juicier and more flavorful in addition to having an appealing browned outer texture. Baking on the other hand, typically requires cooking temperatures of approximately 450° F. or less. Baking involves cooking without an initial searing action and can lead to a dry and tasteless product with an unappealing texture and color.

The desirability of broiled, as opposed to baked, meats compounds many of the aforementioned problems with conventional conveyorized chain cooking devices. For example, such devices have been unable to quickly and efficiently change the thermal output of the heat sources to properly broil meat products in a first instance and then chicken breasts in a second instance. Similar problems of inflexibility exist when sequentially cooking batches of meat products, where the individual products of one batch differ in size from the individual products in the next batch, e.g., a batch of large beef patties versus a batch of small beef patties. Moreover, when flame broiling is particularly desired, varying the thermal intensity between subsequent batches of food product results in inefficient operations and losses of thermal efficiencies.

It has therefore been found desirable to provide an automatic discharge broiler capable of varying the infrared energy radiated at the food product depending on the type of food product and size of the batch to be broiled while avoiding the aforementioned problems in the prior art.

SUMMARY OF THE INVENTION

The foregoing demonstrates the need for a broiler with varying infrared intensity where the food product is easily loaded and discharged and method of use of such a broiler in order to accommodate quickly and efficiently different batches of food products on a menu. Such a broiler and method must also be easy to use and have an associated cost that allows for incorporation into existing fast-food restaurants.

Therefore, it is an object of the invention to provide a discharge broiler for batch cooking and method of use that avoids the aforementioned deficiencies of the prior art.

It is another object of the present invention to provide a broiler that comprises a conveyorized cooking surface, a lower heat source, a pulsing upper heat source, and a control system for varying the intensity of the infrared energy emitted from the upper heat source, the control system also controlling the cooking time and appropriately actuating the conveyorized cooking surface in accordance with a predetermined cooking profile.

It is also an object of the present invention to provide a broiler that incorporates a control unit with predetermined cooking profiles for pre-selected food products, such that the user can select the correct profile for the desired food product.

It is also an object of the present invention to provide a broiler that incorporates a control unit to independently activate the upper and lower heating elements, and to allow or prevent the introduction of food products to the broiler depending on broiler status.

It is also an object of the present invention to provide a broiler that incorporates a control unit to quickly and automatically adjust cooking temperatures, times, and the cycle of the infrared emitting elements, thereby establishing specific cooking profiles for specific food product types.

It is another object of the present invention to provide a broiler that comprises a control unit that provides an output signal to indicate the current cooking profile.

It is also an object of the present invention to provide a broiler that comprises a control unit that provides an output signal to indicate the status of the broiler.

It is also an object of the present invention to provide a broiler that comprises a control unit that can store and display statistical data indicating broiler performance and operating conditions.

It is also an object of the present invention to provide a broiler that comprises a control unit that detects various broiler function faults and provides the ability to diagnose and correct these faults.

It is also an object of the present invention to provide a flexible automatic discharge broiler that incorporates a control unit to quickly and automatically adjust cooking temperatures, times, and the cycle of the infrared emitting elements, thereby establishing specific cooking profiles for specific food product types.

It also an object of the present invention to provide a broiler that comprises a housing which increases operating and thermal efficiency.

It is yet another object of the present invention to provide a broiler that further comprises an opening in the front panel for loading batches of food product, a second opening in the side panel for discharging batches of broiled food product, an automatic door/loading assembly for maintaining thermal boundaries and ensuring proper placement of the food product batches on the conveyorized cooking surface, and further provides a discharge slide for transferring the batches of broiled food products into holding trays.

It is a further object of the invention to provide a method for cooking including the steps of loading a batch of food products onto a conveyorized cooking surface, cooking the food products without moving the conveyorized cooking surface and activating the conveyorized cooking surface upon completion of the cooking process, such that the food products are discharged.

It is a further object of the invention to provide a method for cooking including the steps of loading a batch of food products onto a conveyorized cooking surface, reciprocating the conveyorized cooking surface during cooking to optimize the food product cooking uniformity and upon completion of the cooking process, activating the conveyorized cooking surface such that the food products are discharged.

It is a further object of the invention to provide a method for cooking including the steps of loading a batch of food products onto a conveyorized cooking surface, laterally adjusting the conveyorized cooking surface to optimize the cooking position of the food products, cooking the food products without moving the conveyorized cooking surface, and upon completion of the cooking process, activating the conveyorized cooking surface such that the food products are discharged.

It is a still further object of the invention to provide a method for cooking including the steps of storing a selectable cooking profile in an automatic control means; selecting a cooking profile, loading a batch of food products onto a conveyorized cooking surface, heating the batch of food products with a lower heat source that is below the conveyorized cooking surface, heating the batch of food product with a variable controllably pulsating upper heat source that is above the conveyorized cooking surface, controlling the thermal output of the upper and lower heat sources with the automatic control means depending on the cooking profile selected, and discharging the batch of food products from the conveyorized cooking surface according to the cooking profile selected.

Various other objects, advantages and features of the present invention will become readily apparent from the ensuing detailed description and the novel features will be particularly pointed out in the appended claims.

BRIEF DESCRIPTION OF THE DRAWINGS

The following detailed description, given by way of example but not intended to limit the invention solely to the specific embodiments described, may best be understood in conjunction with the accompanying drawings in which.

BRIEF DESCRIPTION OF THE PREFERRED EMBODIMENTS

Turning now more particularly to the drawings, the automatic broiler of the present invention has widespread application in the fast-food and quick serve services industry. FIGS. 1 through 13, and 15, illustrate one embodiment of the present invention.

Figure 1:
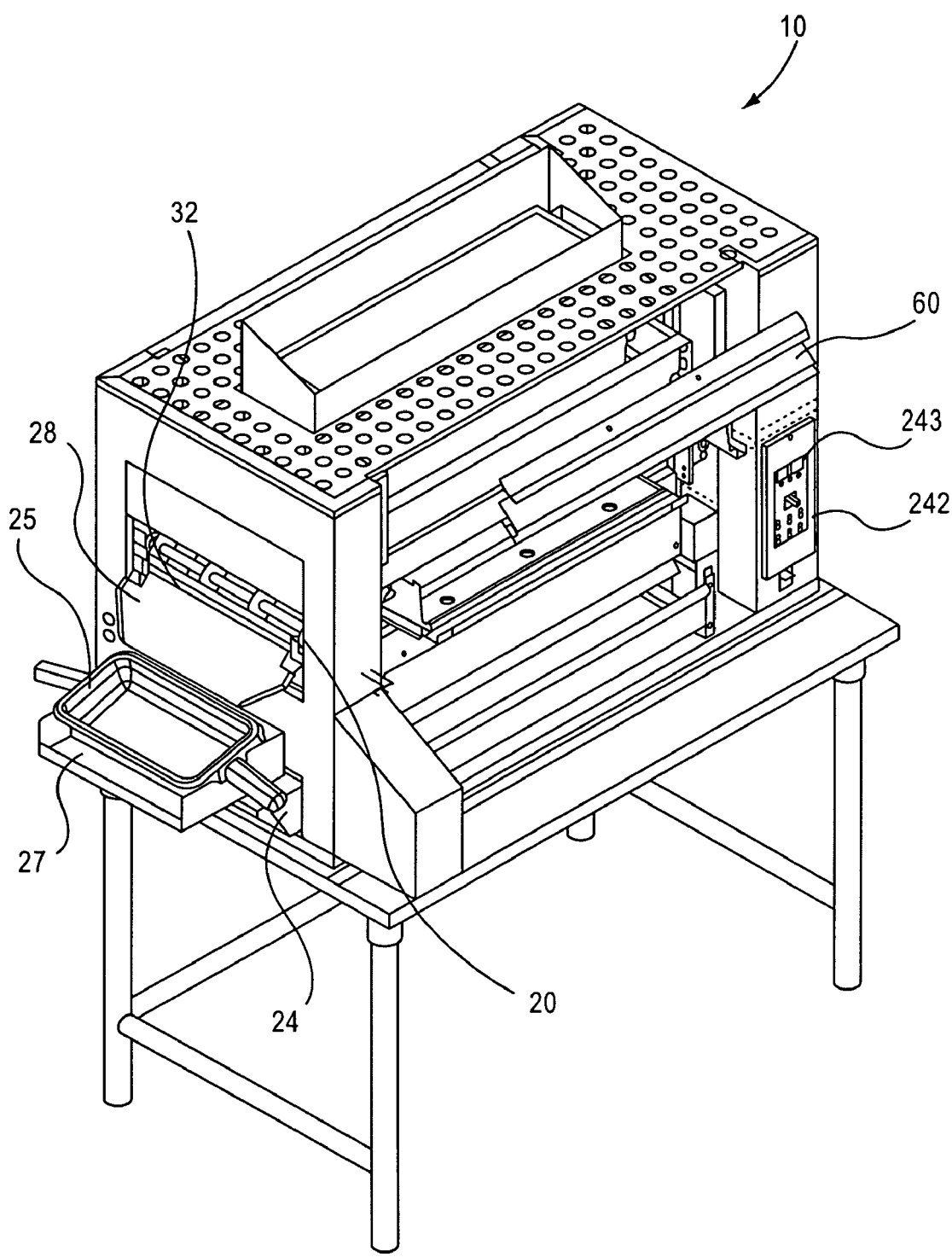
FIG. 1 is front perspective view of a preferred embodiment of the automatic broiler of the invention in accordance with the teaching of the present invention specifically illustrating various outer components thereof.
Figure 2:
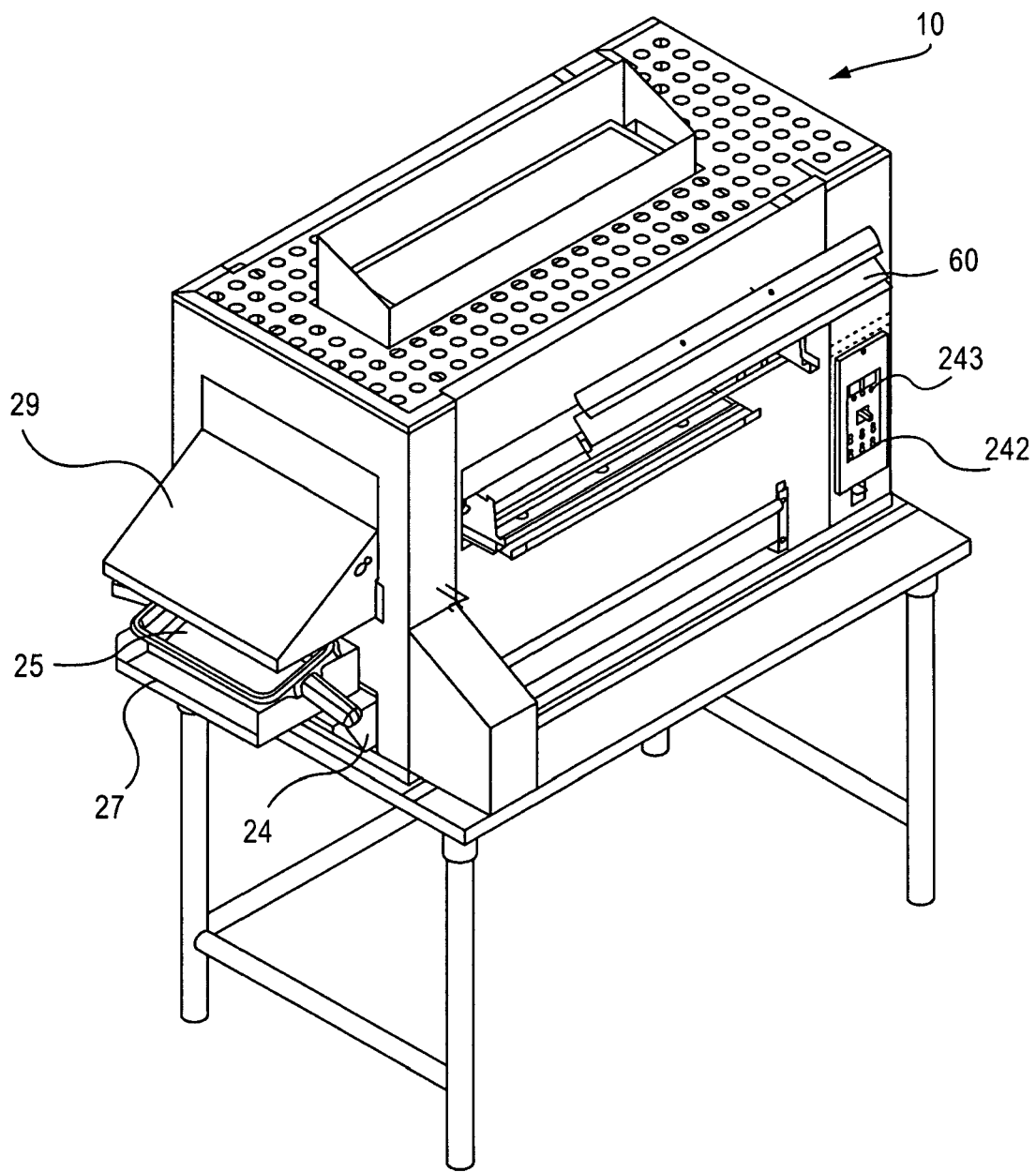
FIG. 2 is front perspective view of the automatic broiler of FIG. 1 with a discharge slide hood.

As seen in FIG. 1, automatic broiler 10 generally comprises door/loader assembly 60, food holding pan 25, discharge slide 28, control display 243 and control keypad 242. The same view is seen in FIG. 2, with the addition of discharge slide hood 29.

Figure 3:
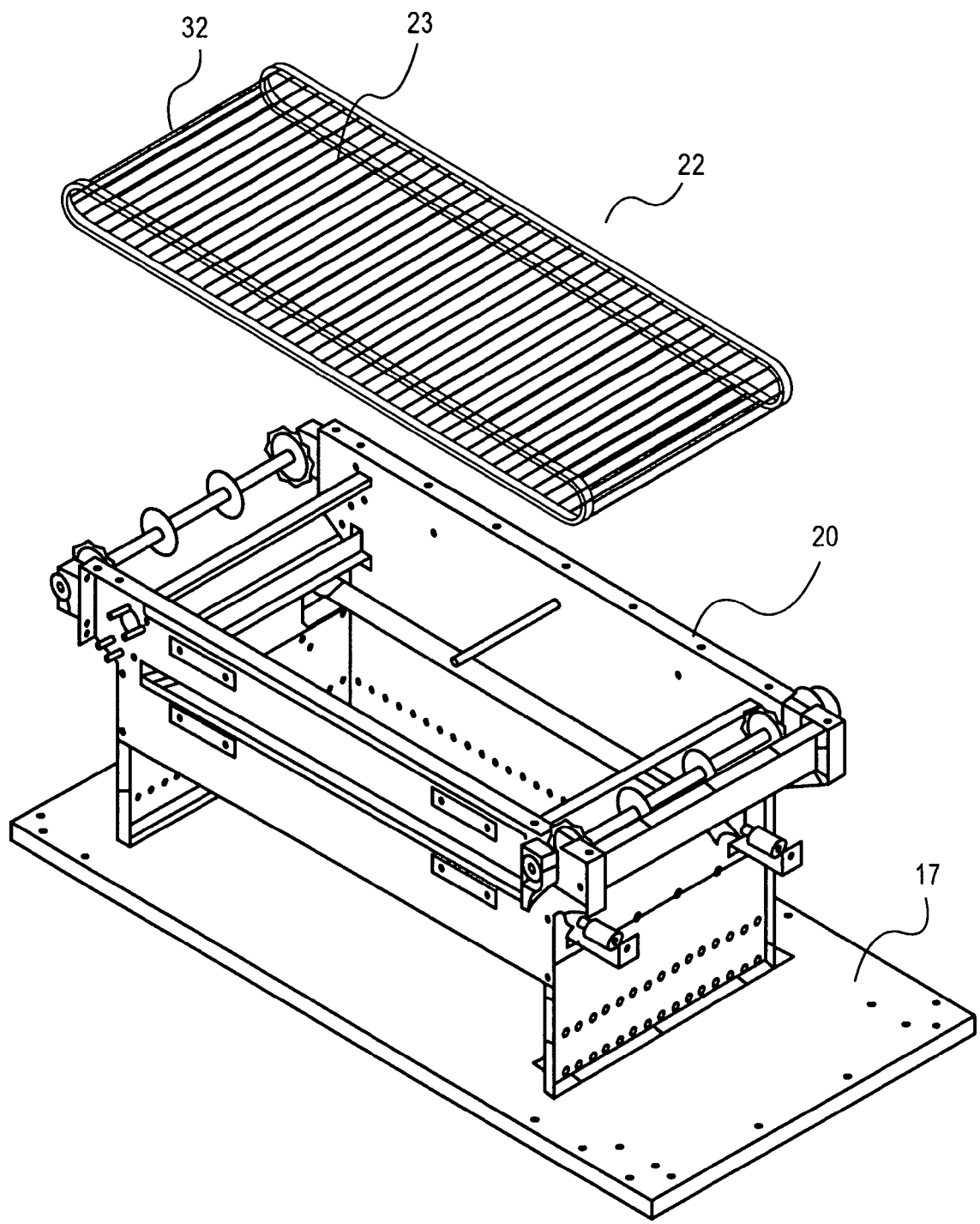
FIG. 3 is an isometric view of the automatic broiler of FIG. 1, which specifically illustrates various inner components thereof and shows the conveyor assembly in exploded form.
Figure 4:
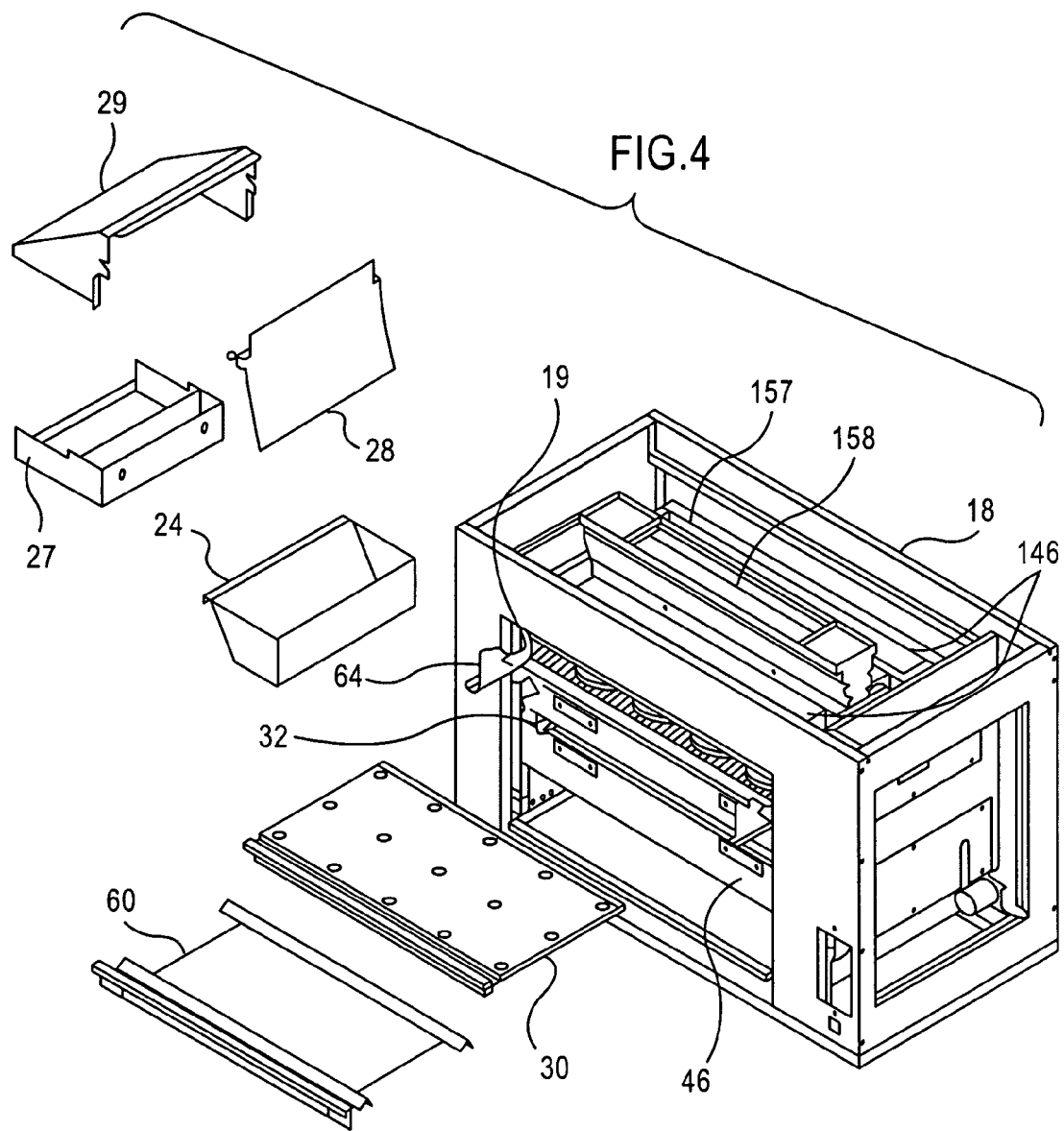
FIG. 4 is an isometric view of the automatic broiler of FIG. 1 with the loading assembly, flame arrestor, and discharge chute in an exploded view.

Turning now to FIGS. 3 and 4, a chassis 20 is shown supporting a conveyorized cooking surface 22. A lower heat source 46 positioned below the conveyorized cooking surface 22 and an upper heat source 146 positioned above the conveyorized cooking surface 22. A discharge slide 28 is adjacent and below the upper surface 23 of the conveyorized cooking surface 22 to receive food products discharged from the conveyorized cooking surface 22 and directs such food products to holding pans.

Preferably conveyorized cooking surface 22 is suitable for broiling various food products and more preferably is suitable for flame broiling various food products. Conveyorized cooking surface 22 may be sized to receive multiple rows of similar food products to facilitate batch cooking of those food products. Conveyorized cooking surface 22 preferably remains stationary during cooking and only advances the food product once the cooking or broiling process is completed. Upon discharge of the food product from the conveyorized cooking surface 22 the conveyorized cooking surface 22 stops movement until the completion of the cooking process for the next batch of food products.

In another embodiment conveyorized cooking surface 22 remains stationary during insertion of the food products, and after insertion is adjusted, forward or backward, in order to facilitate best alignment of heating elements to food product. This alignment will both facilitate uniform cooking and increase thermal efficiency. In this embodiment, alignment is facilitated by a control mechanism as further described below. Preferably, in this embodiment, after initial lateral movement is complete, the conveyorized cooking surface remains stationary during cooking and only advances the food product once the cooking or broiling process is completed. Upon discharge of the food product from the conveyorized cooking surface 22 the conveyorized cooking surface 22 stops movement until the completion of the cooking process for the next batch of food products.

In yet another embodiment conveyorized cooking surface 22 remains stationary during insertion of the food products, and after insertion is reciprocated during the cooking process in order to facilitate a more uniform cooking of the food products. In this embodiment, reciprocation is facilitated by a control mechanism as further described below. Upon completion of the cooking cycle, the reciprocation is stopped. Subsequently, the conveyorized cooking surface advances the food product, discharging it once the cooking or broiling process is completed. Upon discharge of the food product from the conveyorized cooking surface 22 the conveyorized cooking surface 22 stops movement until the completion of the next batch of food products.

Lower heat source 46 is preferably a gas burner for flame broiling food products but may also include other suitable means for broiling products known in the art, such as electric heating elements. Lower heat source 46 is preferably arranged to radiate thermal energy directly to the food products positioned on conveyorized cooking surface 22 so as to uniformly broil the various food products without creating hot spots, cold spots, uneven charring or inconsistency between individual food products of a particular batch. In one embodiment, a plurality of elongated gas burners extend along the length of the broiler, are arranged in parallel, and are disposed underneath conveyorized cooking surface 22. In another embodiment, only one lower burner is disposed underneath conveyorized cooking surface 22. As the skilled artisan will appreciate, various types of different burners can be used including, by way of example and not limitation, atmospheric-type burners, power assist type burners, induced draft burners, primary air induced burners or premix burners.

As seen in FIG. 4, a flame arrestor 30 may be incorporated between the conveyorized cooking surface 22 and the lower heat source 46. Chassis 20 may incorporate drawer receivers 32, tray supports, tabs or other support mechanisms to support flame arrestor 30. The flame arrestor further protects the food products from flame flare-ups resulting from grease, juices, and other renderings coming from the food products as they cook and falling onto the lower heat source 46. Flame arrestor 30 is preferably similar to the flame arrestor disclosed in U.S. Pat. No. 5,727,451, incorporated herein by reference, and comprises a plurality of perforated sheets of low thermal mass and relatively thin construction, and having an open area between approximately 25% and 75% of the total sheet area. The perforated sheets are positioned below the areas of conveyorized cooking surface 22 intended to receive batches of food products. As fat is rendered from the broiling food product, it falls to the perforated sheet to be vaporized and quickly and cleanly burn prior to pyrolization.

The upper heat source 146 preferably directly radiates infrared (IR) energy to the food products according to a predetermined cycle associated with a particular food product. By cycling the intensity of the IR emissions from upper heat source 146, exact cooking profiles can be established to quickly adapt the automatic broiler between batches of various food products, such as beef patties and chicken cutlets. The cyclic IR emissions of upper heat source 146 may vary from an on-off cycle to a cycle of low intensity interrupted by periods of high intensity IR emissions or a cycle of high intensity IR emissions interrupted by periods of low intensity IR emissions, or any combination thereof. Such cycles and their duration are ideally optimized for the particular type of food product and batch size to be broiled in the automatic broiler 10, thereby establishing the cooking profile of the desired food product.

Upper heat source 146 is most preferably arranged to include two or more longitudinal IR emitting heating elements arranged parallel to each other, but could include a single IR emitting heating element. The heating elements 157 preferably extend between side panels 14 and 15 and are disposed above conveyorized cooking surface 22. The preferable distance between the heat elements and the conveyorized cooking surface 22 is in the range of 2-6 inches, most preferably 3 inches. IR emitting heating elements 157 are spaced apart sufficiently to provide for ventilation of combustion gases from lower heat source 46 and cooking fumes coming from the food products on conveyorized cooking surface 22, venting through passage 158. As the skilled artisan will appreciate, like the lower heat source, various types of different burners can be used with upper heat source 146 including, by way of example and not limitation, atmospheric-type burners, power assist type burners, induced draft burners, primary air induced burners or premix burners. Also like the lower heat source, the upper heat source may be electric.

Figure 5:
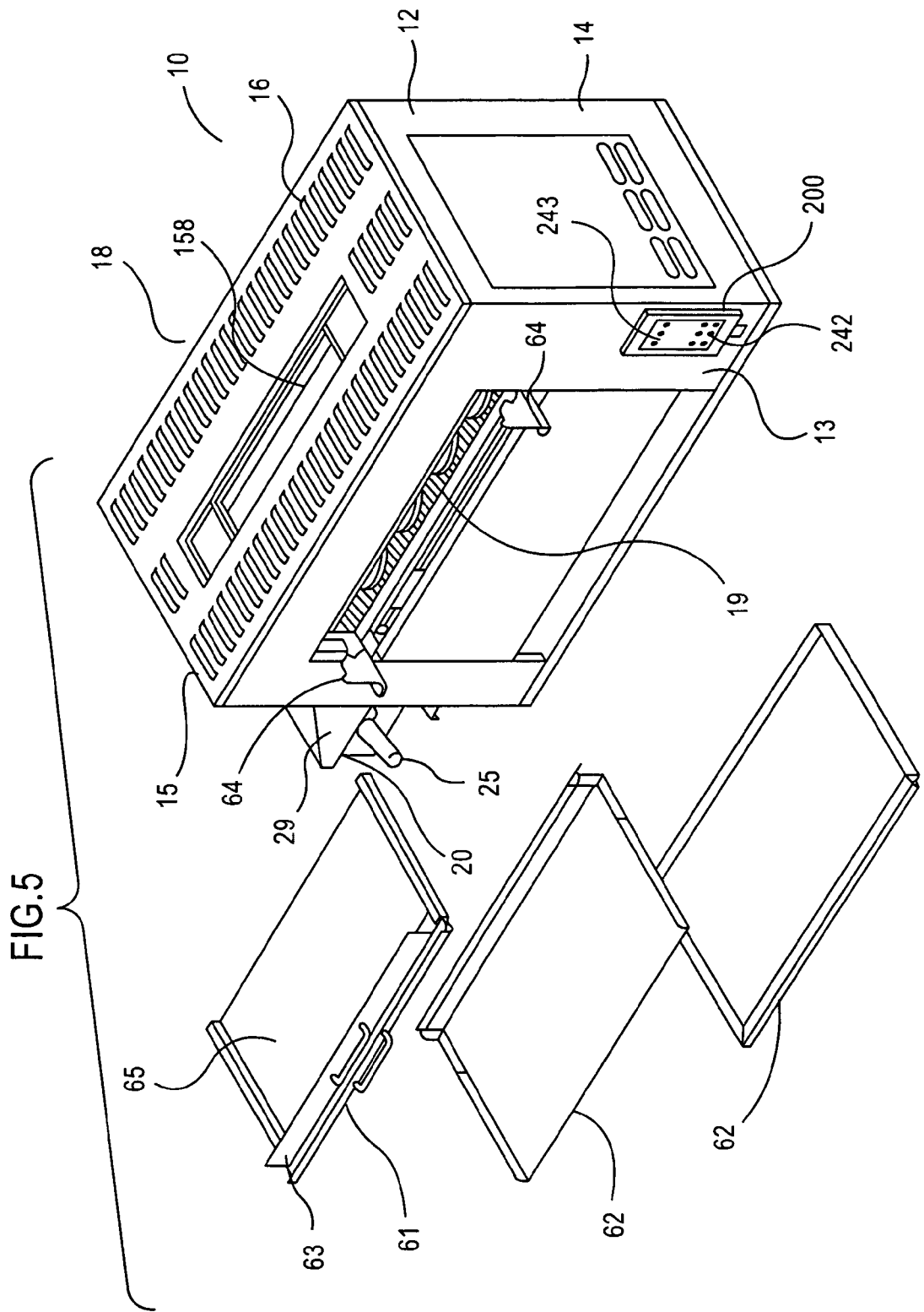
FIG. 5 is an isometric view of the automatic broiler of FIG. 1 specifically illustrating the loading assembly in exploded form.

As seen in FIG. 5, to further increase efficiencies, the automatic broiler 10 may be enclosed by an insulated housing 12 comprising a front panel 13, a right side panel 14, a left side panel 15, a top panel 16, a bottom panel 17, and a back panel 18. The combination of the aforementioned panels creates a closed or semi-closed environment, greatly reducing thermal losses to the surrounding environment and providing for greater control of temperatures at the cooking surface. Enclosing the automatic broiler also helps control the kitchen temperature by preventing heat from escaping from the broiler to the kitchen environment.

In a preferred embodiment front panel 13 includes a first opening (load opening) 19 through which batches of the food product are loaded onto the conveyorized cooking surface 22. Left side panel 15 also preferably includes a second opening (discharge opening) 20, best seen in FIG. 1, through which the batches of food products are discharged from the conveyorized cooking surface 22 to discharge slide 28. It should be noted that first opening 19 may also be incorporated into the left side panel 15, right side panel 14 or the back panel 18. In the embodiment depicted in FIGS. 2-4 the front panel 13 is configured to receive door/loader assembly 60 such that when door loader assembly 60 is opened batches of food product may be loaded onto the conveyorized cooking surface 22 and when door assembly 60 is closed front panel 13 substantially prevents the loss of thermal energy through first opening 19.

In general, the door/loader assembly 60 has five general characteristics. First, it allows for the quick and efficient insertion of a complete or partial batch of food products into the cooking chamber. Second, it locates the product quickly and accurately within the heating chamber. Third, it folds up and out of the way during the cooking process. Fourth, it seals the cooking chamber in order to ensure uniform heat distribution inside the cooking chamber and to increase thermal efficiencies. Fifth, it is removable without the aid of tools to facilitate cleaning and repair.

Figure 6:
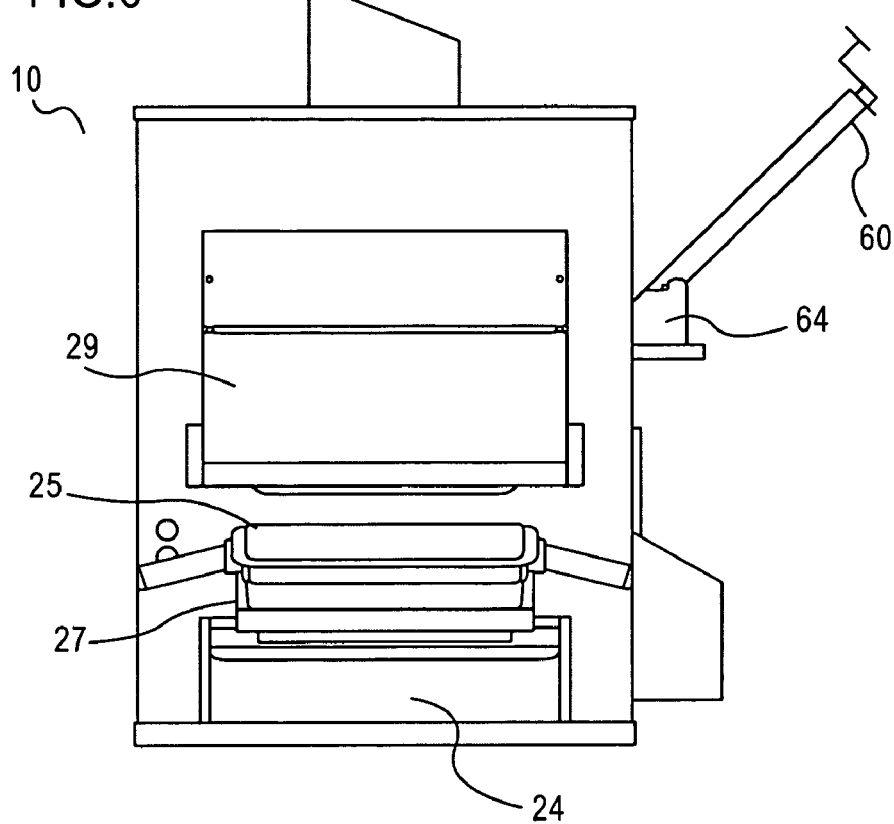
FIG. 6 is a left side view of the automatic broiler of FIG. 1 specifically illustrating the door/loader assembly in the closed position and the discharge/collection assembly.
Figure 7:
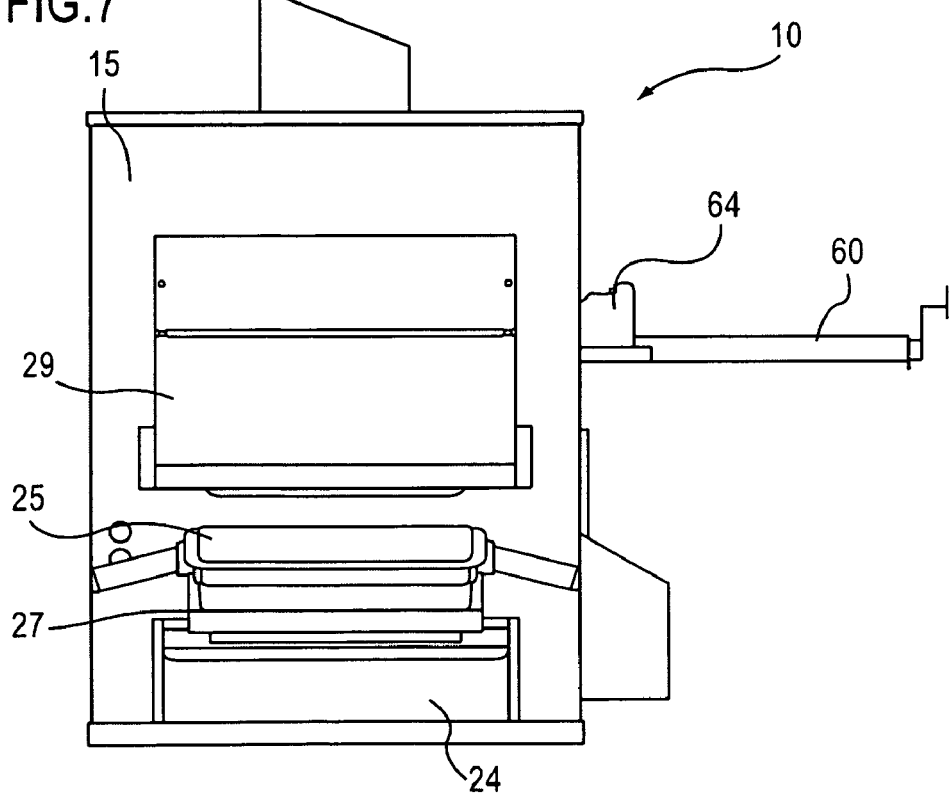
FIG. 7 is a left side view of the automatic broiler of FIG. 1 specifically illustrating the door/loader assembly in the open position and the discharge/collection assembly.
Figure 8:
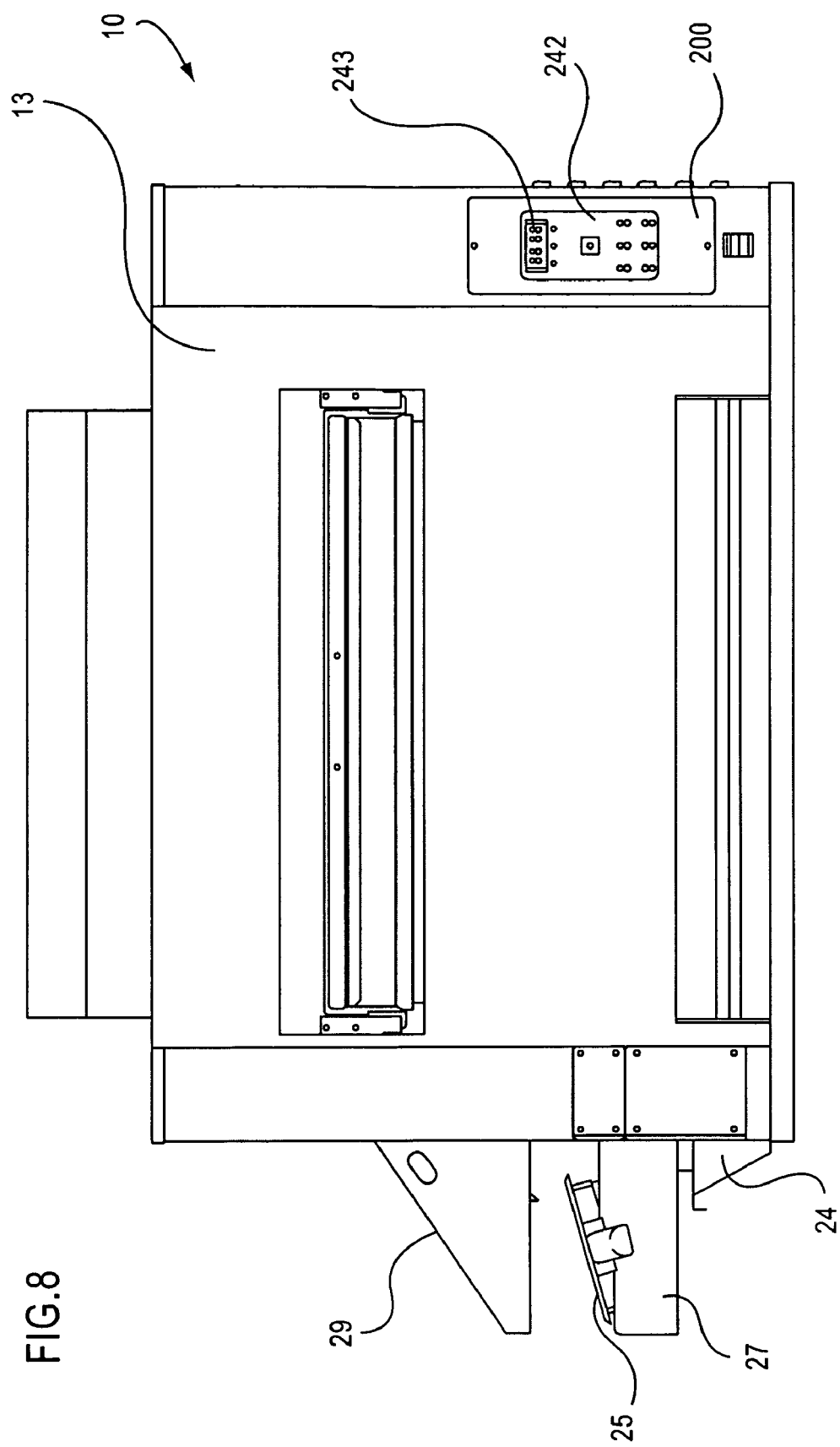
FIG. 8 is a front view of the automatic broiler of FIG. 1 specifically illustrating the control assembly and the discharge/collection assembly.
Figure 9:
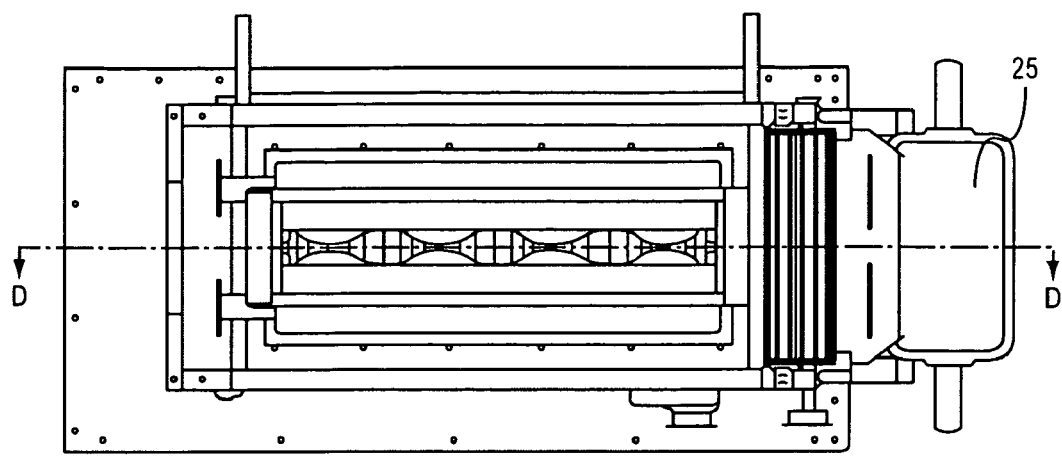
FIG. 9 is a top view of the automatic broiler of FIG. 1.
Figure 10:
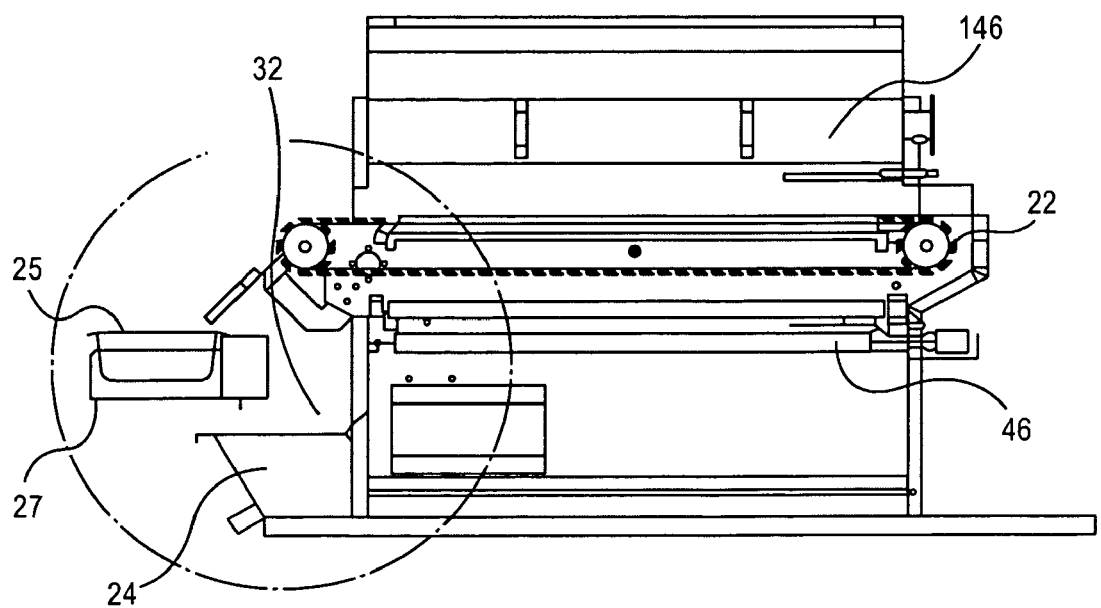
FIG. 10 is a sectional view along line D-D of FIG. 9.
Figure 11:
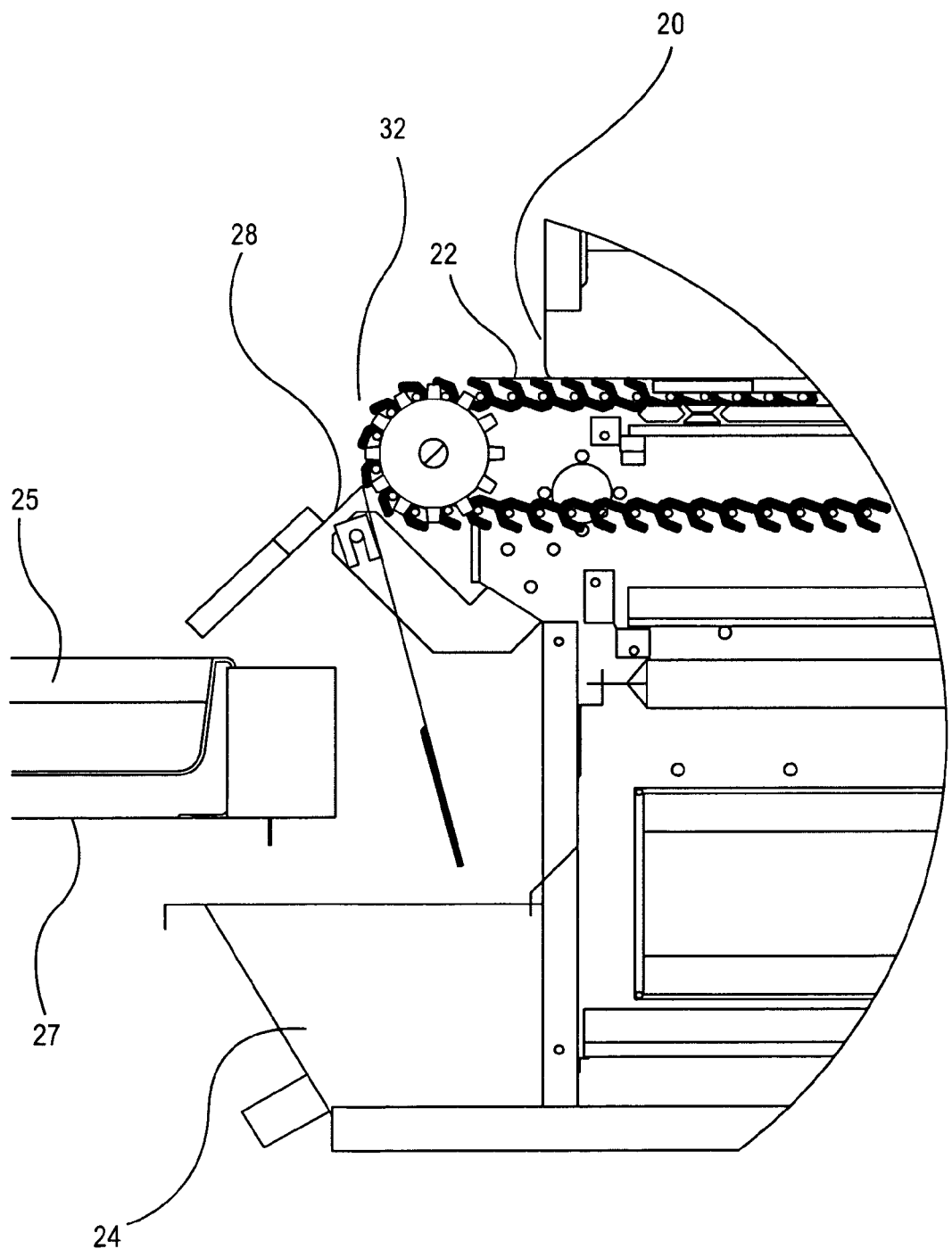
FIG. 11 is an enlarged view of the discharge and collection assembly shown in FIG. 10.

As seen in FIGS. 5-7, in one embodiment, door/loader assembly 60 preferably comprises sliding top shelf 61 and a bottom shelf 62. Sliding top shelf 61 comprises sliding support tray 65 and stopper arm 63. In operation the door/loader assembly 60 is placed in a horizontal loading position. There, the operator places the batch of food product on to the sliding support tray 65. Once fully loaded, the operator slides support tray 65 and stopper arm 63 until the entire support tray 65, and thus food products, are inserted completely into the cooking chamber. Next, the sliding support tray 65 is removed while simultaneously holding the stopper arm 63 in place flush against panel 13, thus facilitating the removal of the food products from the support tray 65 and onto the conveyor cooking surface 22. Finally, the stopper arm 63 slides back to its original position as shown in FIG. 4. Door/loader assembly 60 mounts to the front panel 13 at attachment points 64, which are configured to allow for the door/loader assembly to be manipulated from a horizontal, open loading position to a closed or partially closed cooking position. Additionally, the door/loader assembly may include a mechanism, such as slats or rails on support tray 65 for ensuring that the loaded batch of food products maintain proper positioning on the conveyorized cooking surface.

It should also be noted that in another embodiment the door/loader assembly of the present invention may include an automatic loading mechanism whereby the loading of the food product is synchronized with the cooking process and the discharge of the cooked product.

Right side panel 14 is preferably arranged to receive and house various supply, return and control lines to the automatic broiler, including gas, electric, and control systems. Top panel 16 is preferably arranged to provide for ventilation of combustion gases and cooking fumes. Back panel 18 is preferably arranged to provide for easy removal to facilitate maintenance and cleaning. Bottom panel 17 provides a foundation upon which chassis 20 rests.

As best seen in FIGS. 1, 4, 6-8, 10 and 11, left side panel 15 is preferably arranged to receive inclined discharge slide 28 and rendering collection bin 24 positioned below discharge slide 28. As previously mentioned discharge slide 28 is preferably slightly below the discharge point 32 of conveyorized cooking surface 22. This arrangement allows for the food product to tip downwardly toward the discharge slide allowing grease, juices, or other renderings on the surface of the food product to spill onto the discharge slide and eventually collect in the renderings collection bin 24. Discharge slide 28 may include perforations, slits, or grooves to allow the renderings to pass through the discharge slide 28 and into the collection bin 24. The exact slope of discharge slide 28 may also be optimized to the particular food products anticipated during operation to ensure proper discharge and removal of renderings.

Removable food holding pan 25 is preferably positioned adjacent the lower side of the discharge slide 28 and is supported by pan supporting member 27. Holding pan supporting member 27 may be a simple shelf or a standard mount compatible with holding pan 25. Preferably discharge holding pan 25 is compatible with other kitchen appliances such as holding cabinets, steam cabinets, and product assembly cabinets to minimize the need to transfer the broiled food products between trays, as well as minimize exposure of the broiled food product to uncontrolled environmental conditions.

The automatic broiler 10 includes a control mechanism 200 for controlling operation of the automatic broiler 10. Preferably, the control mechanism 200 has an operator input device, which in one embodiment, comprises a keypad 242 and a display 243 to selectively allow the operator to interact with the control mechanism to input various cooking profiles and/or to select various cooking profiles facilitating control of the broiling environment, such as burner level, temperature, grilling time, and discharge speed. Alternatively the operator input may include dials, switches and the like known to those in the art. For example, rotatably mounted control dials mounted on the front panel 13 and movable in a push-and-turn fashion to any user-selected positions may permit operator input to the control mechanism 200. The control mechanism 200 may also include associated indicator lights (not shown in FIGS. 1-14) and/or display 243 to inform an operator of the selected cooking profile, the status of the automatic broiler, and the condition of the food product within the automatic broiler.

Figure 15:
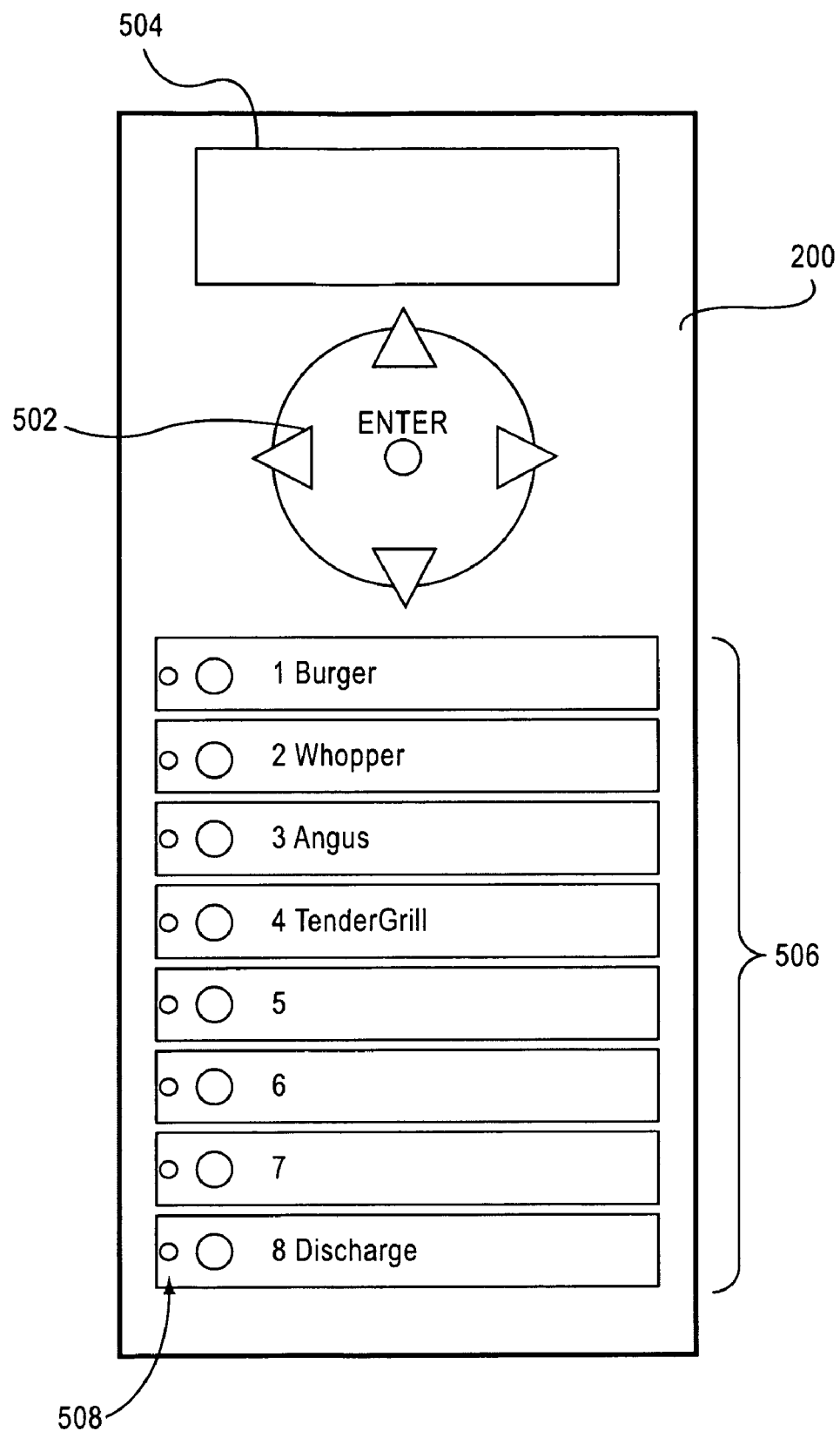
FIG. 15 is a front view of one embodiment of a control mechanism specifically illustrating an operator input device, a display, and indicator lights.

FIG. 15 illustrates a preferred embodiment of the control unit 200 comprising a program key set operator input device 502, a multi-digit alpha-numeric display device 504, and a plurality of product keys 506. Additionally, a plurality of multi-colored information indicator lights 508 correspond to and are adjacent to, or incorporated with, the product keys 506.

In a preferred embodiment, upon initial activation of the broiler, the control unit 200 senses the temperature inside the broiler cavity, compares that temperature to the pre-heat set temperature, and initiates one of two pre-heat cycles. The pre-heat set temperature is preferably set to 300° F. If measured broiler cavity temperature is lower than the pre-heat set temperature, then the control unit 200 activates the lower heat source. In this scenario, the pre-heat cycle is complete when the controller 200 cycles off the lower heat source for the first time, plus an addition elapse of time, preferably 10 minutes. If measured broiler cavity temperature is higher than the pre-heat set temperature, then the control unit 200 continues to measure the cavity temperature, but does not activate the lower heat sources until the measured broiler cavity temperature is lower than the pre-heat set temperature. In this scenario, the pre-heat cycle is complete when the controller 200 cycles off the lower heat source for the first time.

In either case, control unit 200 controls the lower heat source, and any required cycle, in order to achieve and maintain the temperature of broiler cavity. In a preferred embodiment, once the broiler cavity reaches a predetermined temperature, the control unit 200 activates the upper heat source. Upper heat source will remain active during the pre-heat cycle.

Additionally, during the pre-heat cycle, the control unit 200 prevents the user from loading the broiler or starting a cooking cycle. The digital display device 504 will display a predetermined message and a LED indicator will indicating that the broiler should not be or cannot be loaded during this cycle. In addition, the controller 200 will indicate a pre-heat status by illuminating indicator lights 508 in a predetermined selection of color and pattern. The digital display device 504 will display a predetermined message indicating the broiler status once pre-heat cycle is complete. In a preferred embodiment, the broiler control unit 200 may be programmed during the pre-heat cycle in order to maximize efficiency. When the broiler satisfies a set of pre-established conditions signaling the completion of the pre heat phase, such as those described above, the pre-heat cycle is complete and controller initiates the next cycle, an idle cycle.

Once, pre-heating is complete, the control system will maintain the broiler in a ready position, or idle cycle. During the idle cycle, the controller 200 maintains the broiler cavity at a set temperature, the idle set temperature. In a preferred embodiment, the idle set temperature is the same as the pre-heat set temperature. Once the controller 200 initiates the idle cycle, the lower heat source 46 will shut off, if not already off, while the upper heat source 146 remains activated. In this idle cycle, the controller 200 monitors the broiler cavity temperature. If the oven cools to a programmed lower temperature limit, the lower heat source 46 will cycle on and off to maintain the temperature cavity at the idle set temperature. Oven status in the idle cycle will be indicated by illuminating indicator lights 508 in a predetermined selection of color and pattern, such as "READY" or "RDY," different from that of the pre heat cycle.

From the idle cycle, the user can enter the cook cycle. During the cooking cycle, the controller 200 will cycle the upper heat source 146 through a pre-defined profile and will control the cavity temperature by cycling the lower heat source 46 on and off. Upon completion of the cook cycle, the controller 200 activates the conveyorized cooking surface in order to unload the cooked product. In a preferred embodiment, the controller 200 will activate an audible alarm upon completion of the cook cycle.

Selecting a desired cooking profile for a cook cycle is accomplished by pressing the desired product key 506. Operator choice is confirmed by the illumination of the corresponding indicator light 508 in a predetermined color while the remaining indicator lights remain unlit. As the broiler is executing the pre-programmed cooking profile, the indicator light corresponding to the selected cooking profile will indicate the broiler's cooking status by illuminating in a predetermined fashion, such as by flashing. Additionally, the display device will alternatingly display a predetermined message corresponding to the cooking profile chosen, and the remaining time required for the broiler to complete the cooking cycle. Completion of the cooking cycle is indicated by the countdown times on the display device 504 indicating zero time remaining. An audible alarm will sound at the completion of the cooking cycle. Upon completion of the cooking cycle, the conveyorized cooking surface 22 will index a predetermined distance to unload the cooked food product. During the unload procedure, the display device 504 will continue to indicate zero time remaining. Concurrently, the indicator light 508 associated with the selected cooking cycle will remain illuminated but in a distinctive pattern to differentiate between the cooking cycle and the unload procedure. All other indicator lights 508 will remain unlit. When the unload procedure is complete, indicated by the completion of the index of the conveyorized cooking surface 22, the broiler assumes an idle status with appropriate displays.

In preferred embodiments, the control unit or mechanism 200 has three main, programmable functions. First, the control unit 200 acts to control the cooking profile for a particular product—the recipe function. As described in more detail below, the cooking profile consists of a regular or irregular sequence of upper heat source on-times and off-times. Second, the control unit 200 acts to control the underlying system parameters. Third, the control unit 200 keeps track of statistical data.

With respect to the second programmable function, the control unit 200 acts to control the underlying system parameters. In a preferred embodiment, the control unit controls the following: (1) Idle Temperature Parameter; (2) Offset Parameter; (3) ° F. or ° C. Parameter; (4) Chain Drive Time Parameter; (5) Over Temperature Alarm; (6) Under Temperature Alarm; (7) Temperature Hysteresis; (8) Audible alarm/Disable; and (9) Preheat IR Temperature.

The Idle Temperature Parameter is the set-point temperature for the broiler during the preheat and idle cycles. Preferably, the temperature will be from 500 to 900° F., most preferably 680° F.

The Offset Parameter specifies a difference between the measured temperature and the displayed temperature. A positive offset parameter means that the displayed temperature will be below the measured temperature by the offset parameter. A negative offset parameter means that the displayed temperature will be above the measured temperature by the offset parameter. Preferably, the offset parameter will be set between −100 to +100° F., most preferably 0° F.

° F. or ° C. Parameter acts to change the temperature displayed between Fahrenheit (F) and Celsius (C). Preferably, the default on this parameter is Fahrenheit (F).

The Chain Drive Time Parameter defines the amount of time required to drive the chain to the conveyorized cooking surface a set amount, preferably half a complete rotation. Preferably, this parameter is set between 1 to 10 seconds, most preferably 6 seconds.

The Over Temperature Alarm parameter is the temperature above the set-point at which an over temperature alarm will occur. Preferably, this is set between 0 to 200° F., most preferably 200° F.

The Under Temperature Alarm parameter is the temperature below the set-point at which an under temperature alarm will occur. Preferably, this is set to between 0 to 200° F., most preferably 100° F.

The control will have an ON-Off type control. The control will cycle the temperature output off at the set point temperature and will cycle it back on at a set number of degrees below the set point temperature. That set number of degrees, preferably 10° F., is defined as the Temperature Hysteresis. In a preferred embodiment, it will be set between 2 to 50° F., most preferably 2° F.

The Audible alarm/Disable allows the controller the ability to turn off the audible alarm. With the buzzer turned off, the buzzer will still sound for temperature sensor and ignition faults.

The Preheat IR Temperature is the temperature at which the IR burner comes on during the Preheat cycle. Preferably, this will be set between 301 to 900° F., most preferably 500° F.

With respect to the third programmable function, the control unit 200 keeps track of statistical data. In a preferred embodiment, the control unit 200 keeps track of the following:

Product Counts—Keeps track of the number of times that a product has been run.

Run Time—Keeps track of the number of hours that the broiler has been under power.

IR Ignition Attempts—Keeps track of the number of times that the control supplies an output signal for the IR burners.

IR Initialization Failures—Keeps track of the number of times that the control has detected a difference in the output and input signals for the IR burners during the pre-heating cycle.

IR Failures During Cook—Keeps track of the number of times that the control has detected a difference in the output and input signals for the IR burners during the cooking cycle.

IR Failures During all Other Modes—Keeps track of the number of times that the control has detected a difference in the output and input signals for the IR burners during periods not covered in IR Initialization Failures and IR Failures During Cook.

IR Gas Lockout Failures—Keeps track of the number of times that the control has had a GAS fault related to the IR burners.

Lower Burner Ignition Attempts—Keeps track of the number of times that the control supplies an output signal for the lower burners.

Lower Burner Initialization Failures ("LbIf")—Keeps track of the number of times that the control has detected a difference in the output and input signals for the lower burners during the pre-heating cycle.

Lower Burner Failures During Cook ("LbCf")—Keeps track of the number of times that the control has detected a difference in the output and input signals for the lower burners during the cooking cycle.

Lower Burner Failures All Other Modes—Keeps track of the number of times that the control has detected a difference in the output and input signals for the lower burners during periods not covered in LbIf and LbCf.

Lower Burner Gas Lockout Failures—Keeps track of the number of times that the control has had a GAS fault related to the Lower burner.

In a preferred embodiment, the control unit 200 is designed to detect various broiler function faults and provides the ability to diagnose and correct these faults. For example, the control unit 200 preferably detects temperature faults, temperature sensor faults, and ignition faults. When the controller detects such faults, the display will show a unique fault identifier. The faults preferably include four main categories.

The first is an over temperature fault. An over temperature fault occurs when the control unit senses that the measured temperature is a set number of degrees above the idle set temperature for a set number of continuous seconds. Preferably, this temperature is set to 100° F. above the idle set temperature and the set number of seconds is set to 30. Preferably, this fault will not be checked during the cook cycle. In a preferred embodiment, when this condition is detected: (1) the display will show "HI" or a similar unique fault indicator; (2) the control will allow the user to load or start a cook cycle; and (3) the lower burner output will stay off until the measured temperature is reduced to the Idle set point or a cook is initiated. Preferably, this fault will self-clear when the temperature is reduced.

The second is an under temperature fault. An under temperature fault occurs when the control senses that the unit is a set number of degrees than the idle set temperature for a set number of continuous seconds, preferably 30. Preferably, this fault will be checked during idle and cook cycles. In a preferred embodiment, when this condition is detected during the idle mode: (1) the display will show "LO" or a similar unique fault indicator and (2) the control will not allow the user to load or start a cook cycle. This fault will self-clear when the temperature is increased. In a preferred embodiment, when this condition is detected during the cook cycle the control will continue cooking normally and then sound an alarm at the end of the cook. Preferably, this alarm will consist of an audible and a visible alarm. This alarm will continue past the end of the cook and chain rotation and will need to be cancelled by the operator by pressing any key.

The third is a sensor failure. A sensor failure occurs when the control senses a short circuit or open circuit in the sensor circuit. Preferably, the control will have a set delay, most preferably 10 seconds, before it indicates or reacts to a probe error. When this condition is detected the display will show "PROB" or a similar unique fault indicator and an alarm will sound. The upper and lower gas valve outputs will be shut down unless the unit is in the middle of a cook cycle. If the unit is in the middle of a cook cycle, the control will continue cooking normally and then sound an alarm at the end of the cook cycle.

The fourth is an ignition fault. Here, the control will compare an input signal from the ignition control module to the corresponding ignition control output. With respect to an ignition fault, if the broiler is in the pre-heat cycle, the control will look for a difference in either the IR or lower signals that last for more than a set time, preferably 15 continuous seconds. On the first occurrence the control will cycle the burner output that has the fault (i.e. IR or lower burner output) by cycling output off for a set time, preferably 4 seconds, and then back on. If the control detects a second occurrence on the same burner within 5 minutes of the first occurrence the control will: (1) sound an alarm and (2) shut down both gas valve outputs. If the broiler is in the idle mode, the control will look for a difference in either the IR or lower signals that last for more than at set time, preferably 15 continuous seconds. On the first occurrence the control will cycle the burner output that has the fault (i.e. IR or lower burner output) off for a set time, preferably 4 seconds, and then back on. If the control detects a second occurrence on the same burner within a set time, preferably 5 minutes, of the first occurrence the control will: (1) sound an alarm and (2) shut down the gas valve output that is related to the fault condition. If the broiler is in a cook cycle, when the control detects a difference in either the upper or lower signals the control will immediately stop the cook time countdown whenever there is a difference in these signals (ignoring the delay for ignition module initialization). The control will allow the time countdown to be stopped for a maximum of 5 minutes. After 5 minutes the control will proceed with the countdown normally. The control will continue cooking normally and then sound an alarm at the end of the cook.

The control mechanism 200 is used to input and select a desired cooking profile and control the operation and environment of the automatic broiler. The control mechanism 200 is operable to vary the amount of radiant heat as needed to properly cook, and preferably broil, the desired food product. In one embodiment, the control mechanism comprises suitable timer and duty cycle controls to control the length of the duty-cycle of the upper heat source 146, the term "duty cycle" meaning the ratio of upper heat source on-time (activated) to upper heat source on-time plus off-time (deactivated). Additionally, the control mechanism 200 controls the operation and movement of the conveyor cooking surface 23, providing control for any initial forward or backward movement to facilitate alignment of the food products with the heating elements and/or the final operation and thus discharge of the cooked food products. The control mechanism 200 uses a suitable microprocessor and appropriate software to control the conveyorized cooking surface as well as relays 248 (FIG. 13) that activate the upper heat sources 146. Upper heat sources will be activated and deactivated in different ways, depending on their configuration. As the skilled artisan would readily appreciate, electric heating elements could for example, be activated and deactivated by controlling the power to the heating circuit. Gas burners could be activated or deactivated by controlling electronic solenoid valves. In accordance with the present invention, other heating elements may be controlled in other ways known in the art.

Figure 12:
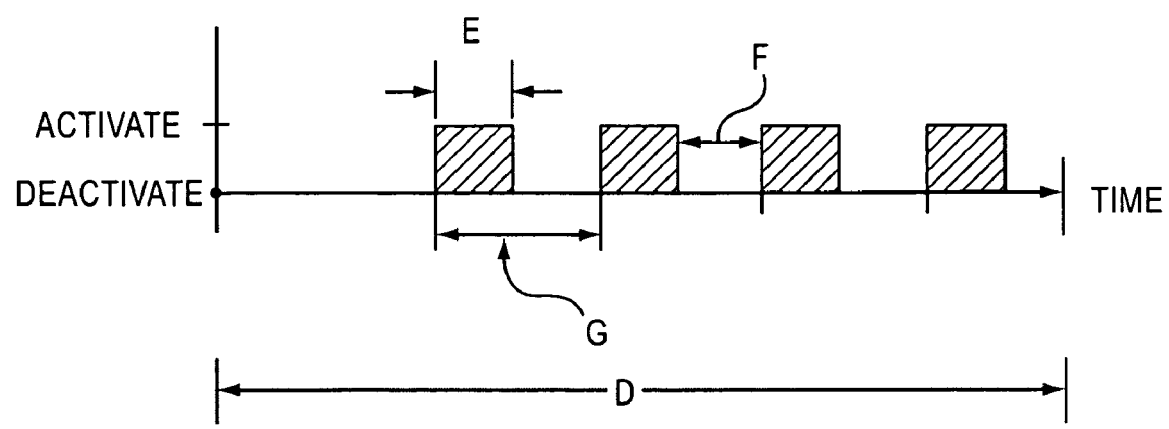
FIG. 12 is a time vs. heat source activation curve for an embodiment of the duty cycle mode of operation.

FIG. 12 illustrates an embodiment in which the heat source 146 is successively activated and deactivated in a controlled, periodic sequence or duty cycle, indicated at G, to vary the amount of radiant heat as needed to properly cook, and, preferably broil, the desired food product. In this particular embodiment, each duty cycle G comprises a heating interval E during which time the heat source 146 is activated followed by interval F during which time the heat source is deactivated. The intensity and duration of the periodic cycles of infrared emission from the upper heat source 146, are determined empirically and will depend on the desired batch of food product to be broiled.

Figure 13:
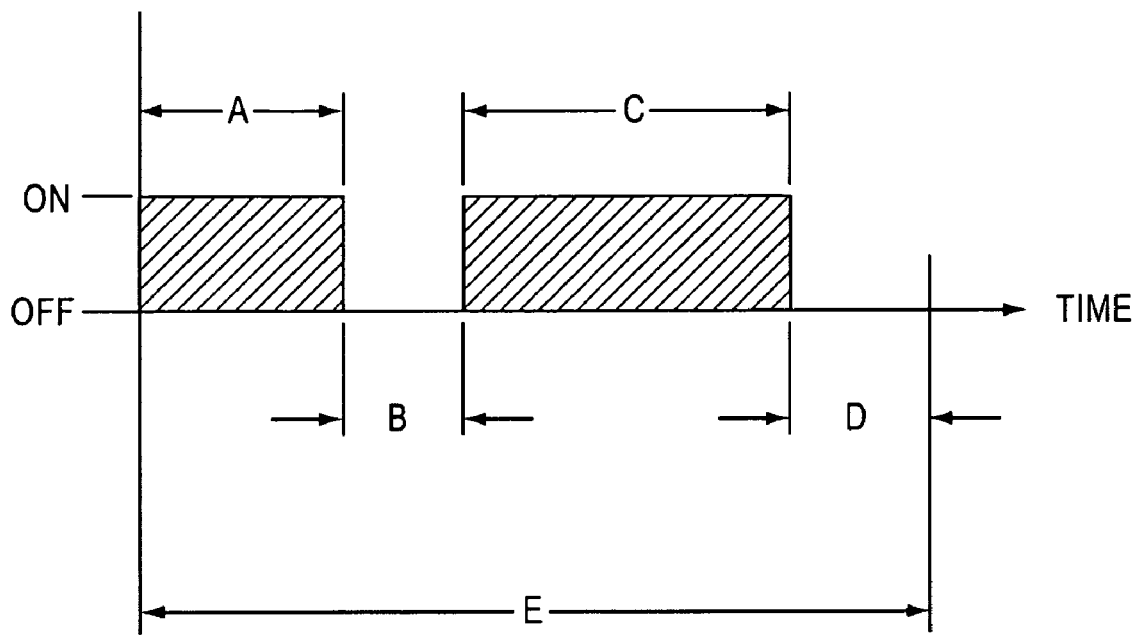
FIG. 13 is a time vs. heat source activation curve for an embodiment of the pre-programmed irregular sequence mode of operation.
Figure 14:
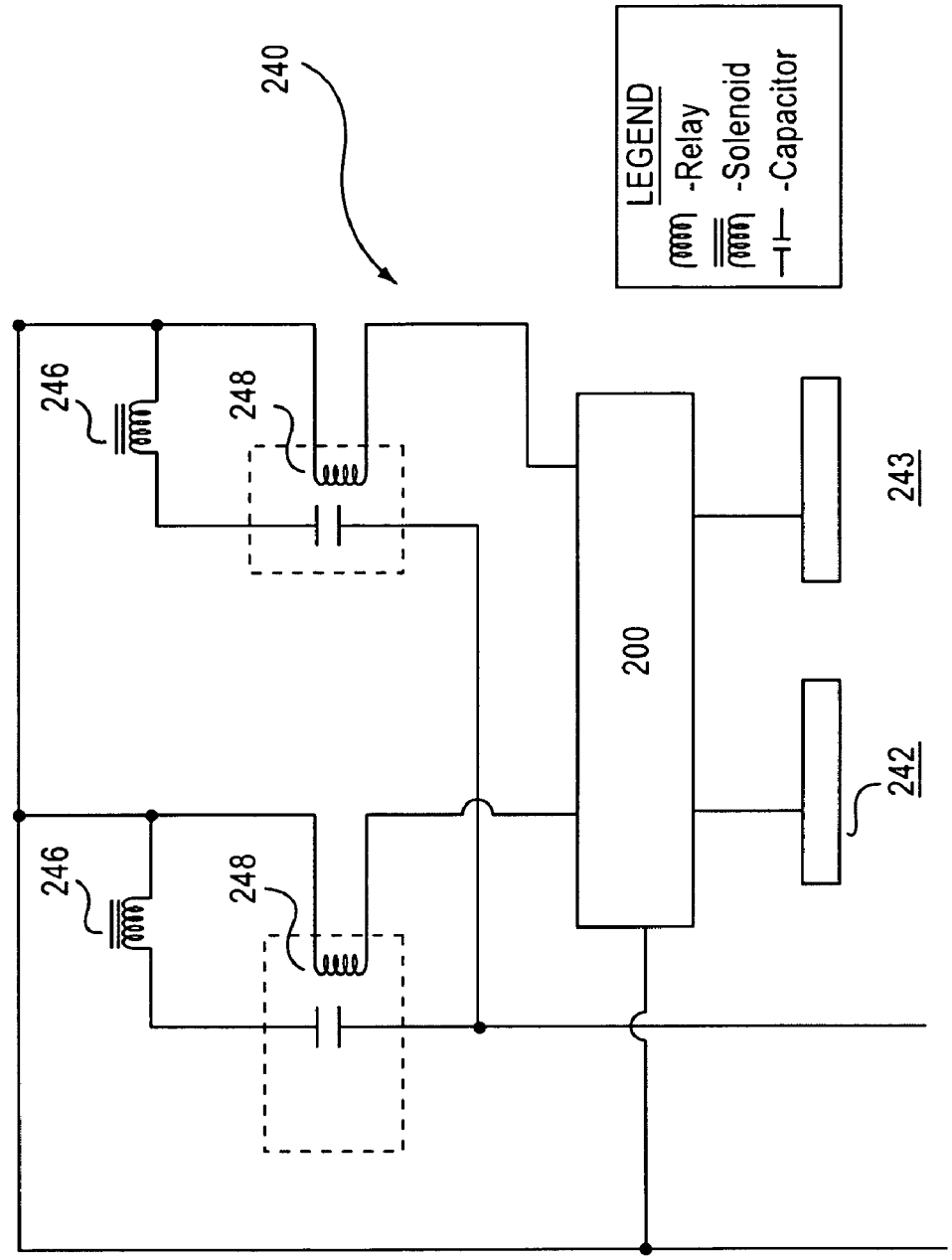
FIG. 14 is a circuit diagram of an embodiment of the pulsating IR heating elements control system to be used in conjunction with the automatic broiler of FIG. 1.

In other embodiments, the periodic duty cycle function is replaced with a pre-programmed irregular sequence of upper heat source on-times and off-times. FIG. 13 is an example of such a pre-programmed irregular sequence. FIG. 13 illustrates an embodiment in which the heat source 146 is successively activated and deactivated in a controlled, pre-programmed irregular sequence to vary the amount of radiant heat as needed to properly cook, and preferably broil, the desired food product. In this particular embodiment, A and C represent length of on time for the top IR heating element or elements, while B and D represent length of off time for the top IR heating element or elements. E is the sum of all on and off times in the cooking program. A, B, C, and D can be programmed to any length of time and additional off or on periods can be added. In these embodiments, an irregular sequence, as opposed to the periodic duty cycle, is used to vary the amount of radiant heat as needed to properly cook, and preferably broil, the desired food product. The intensity and duration of the irregular sequence of infrared emission from the upper heat source 146, is determined empirically and will depend on the desired batch of food product to be broiled.

FIG. 13 is a simplified schematic of a portion of one embodiment of an oven control circuit 240 that is controlled by the control mechanism 200. The circuit 240 operates upper heat source 146 of the automatic broiler 10. In the embodiment shown in FIG. 13, the circuit 240 operates solenoids 246. When energized, solenoids 246 open a gas flow valve thus controlling the flow of gas to the upper heat source. Other embodiments could use other heating control mechanisms well known in the art, such as energizing conventional relays. Using a keypad 242 and a display 243, or other suitable operator input device, the control mechanism 200 can be programmed to control the heat upper heat sources 146 according to the selected cooking profile for the desired food product. Similarly, control mechanism 200 may also control the lower heat source 46 and the conveyorized cooking surface 22, although in a preferred embodiment, lower heat source provides a continuous uniform heat to the conveyorized cooking surface 22 rather than cycling through duty cycles. In one embodiment the conveyorized cooking surface 22 remains motionless during loading and broiling and only advances to discharge the batch of food product after the food product has completed cooking. In another embodiment the conveyorized cooking surface 22 may be initially laterally adjusted (forward or backward) to facilitate product cooking uniformity and prevent thermal inefficiency by ensuring the most direct IR heat is applied to the food products.

In use, a preferred embodiment of the present invention stores a cooking profile, or recipe, in the automatic control unit 200 which establishes cooking temperatures, thermal output for the lower heating source 46 and the upper heat source 146, the period, intensity and duration of the cycles of infrared emission from the upper heat source 146, and the activation of the conveyorized cooking surface 22. An operator selects a stored cooking profile depending on the desired batch of food product to be broiled. The food product is then positioned on the door/loader assembly 60 and door/loader assembly 60 is loaded through the first opening 19 and the batch of food product is deposited on the conveyorized cooking surface. Preferably, the conveyorized cooking surface is stationary during loading and cooking. The operator then removes door/loader assembly 60 from the first opening 19 and places door/loader assembly in the closed position to improve thermal efficiency of the broiler and prevent thermal losses through front opening 19.

Additionally, the automatic control unit 200 in a preferred embodiment can comprise an interface to allow cooking profiles and operating software to be downloaded to the control unit 200 from an external source. A preferred embodiment may comprise a storage device to maintain operating data, electromechanical data, and fault information for uploading through the same interface.

Preferably lower heat source 46 provides continuous heat to the batch of food-product on the conveyorized cooking surface 22. Alternatively, the intensity of the heat emitted from lower heat source 46 may be varied according to the particular food product to be broiled and the size of the batch. Upper heat source 146, however, preferably pulses or cycles through periods of high intensity infrared emission and low intensity infrared emission depending on the selected cooking profile. The cyclic IR emissions of upper heat source 146 may vary from an on-off cycle to a cycle of low intensity interrupted by periods of high intensity IR emissions or a cycle of high intensity IR emissions interrupted by periods of low intensity IR emissions, or any combination thereof. Such cycles and their duration are ideally optimized for the particular type of food product and batch size to be broiled in the automatic broiler 10, thereby establishing the cooking profile of the desired food product.

When the period of cycles from the upper heat source has finished the batch of food products are completely cooked and ready for discharge. The conveyorized cooking surface then activates and advances the batch of food product toward discharge end 32. The food product upon reaching discharge end 32 is tipped downwardly toward the discharge slide 28 allowing any grease, juices, or other renderings on the surface of the food product to spill onto the discharge slide 28 and eventually collect in the renderings collection bin 24. The food product then slides down the discharge slide and into the holding pan 25.

Although the invention has been shown and described above with reference to certain preferred embodiments, it will be readily appreciated by those of ordinary skill in the art that various changes and modifications may be made therein, without departing from the spirit and scope of the invention. It is intended that the claims be interpreted as including the foregoing as well as various other such changes and modifications.

What is claimed is:

1. An automatic broiler for batch cooking comprising:
   a conveyorized cooking surface;
   a lower heat source positioned below the conveyorized cooking surface;
   an upper heat source positioned above the conveyorized cooking surface;
   a control means for selectively storing multiple cooking profiles of food products;
   the control means regulating the thermal output of the upper and lower heat sources depending on the cooking profile selected;
   the control means pulsing the thermal output of the upper heat source independently from the lower heat source to provide the appropriate thermal output depending on the cooking profile selected, wherein the pulsed thermal output of the upper heat source includes a pre-programmed irregular sequence of upper heat source on-times and off-times;
   the control means timing the thermal output of the upper and lower heat sources depending on the cooking profile selected; and
   the control means discharging the batch of food products according to the cooking profile selected by actuating the conveyorized cooking surface.

2. The automatic broiler of claim 1 wherein said upper heat source is arranged in at least two longitudinal heating elements with a vent interspaced between each row of heating elements to provide for ventilation of gases.

3. The automatic broiler of claim 1 wherein said lower heat source has an open flame.

4. The automatic broiler of claim 3 wherein a flame arrestor is above said lower heat source but below the conveyorized cooking surface.

5. The automatic broiler of claim 3 wherein said lower heat source comprises at least two longitudinal heating elements.

6. The automatic broiler of claim 1 further comprising:
   an insulated housing surrounding the conveyorized cooking surface and heat sources;
   a load opening in the insulated housing for loading batches of food product onto the conveyorized cooking surface;
   a discharge opening in the insulated housing for discharging batches of food product from the conveyorized cooking surface at the completion of the selected cooking profile.

7. The automatic broiler of claim 1 further comprising:
   an insulated housing surrounding the conveyorized cooking surface and heat sources, said insulated housing further comprising;
   an insulated front wall having an opening for loading batches of food product onto the conveyorized cooking surface;
   an insulated back wall;
   an insulated bottom wall wherein the bottom wall is adapted to receive renderings from the broiled food products on the conveyorized cooking surface;
   an insulated top surface adapted provide for ventilation of gases; and
   insulated side walls wherein at least one of the side walls incorporates an opening for discharging batches of food product from the conveyorized cooking surface at the completion of the selected cooking profile.

8. The automatic broiler of claim 6 further comprising an integrated door/loader assembly for automatically loading batches of food product onto the conveyorized cooking surface through an opening in the insulated housing wherein the door/loader assembly minimizes thermal losses from the insulated housing after the batch of food product has been loaded.

9. The automatic broiler of claim 8 further comprising a food product placement means for ensuring that the loaded batch of food products maintain proper positioning on the conveyorized cooking surface.

10. The automatic broiler of claim 6 wherein the discharge opening in the insulated housing for discharging batches of food product includes a discharge slide and a collecting pan for collecting the batch of food product after discharge from the continuous cooking surface.

11. The automatic broiler of claim 1 in which the control means includes a selection of predetermined cooking profiles for selected food products.

12. The automatic broiler of claim 1 in which the control means can activate the upper and lower heating elements independently.

13. The automatic broiler of claim 1 in which the control means provides an output signal indicating broiler status.

14. The automatic broiler of claim 1 in which the control means collects and stores statistical data on broiler performance and operating conditions.

15. An automatic broiler for batch cooking comprising:
   a conveyorized cooking surface;
   a lower heat source positioned below the conveyorized cooking surface;
   an upper heat source positioned above the conveyorized cooking surface;
   a controller for selectively storing multiple cooking profiles of food products;
   the controller regulating the thermal output of the upper and lower heat sources depending on the cooking profile selected;
   the controller pulsing the thermal output of the upper heat source independently from the lower heat source to provide the appropriate thermal output depending on the cooking profile selected, wherein the pulsed thermal output of the upper heat source includes a pre-programmed irregular sequence of upper heat source on-times and off-times;
   the controller timing the thermal output of the upper and lower heat sources depending on the cooking profile selected; and
   the controller discharging the batch of food products according to the cooking profile selected by actuating the conveyorized cooking surface.

* * * * *

UNITED STATES PATENT AND TRADEMARK OFFICE
CERTIFICATE OF CORRECTION

| | | |
|---|---|---|
| PATENT NO. | : 7,921,767 B2 | Page 1 of 1 |
| APPLICATION NO. | : 11/899912 | |
| DATED | : April 12, 2011 | |
| INVENTOR(S) | : Jeffrey R. Cook et al. | |

It is certified that error appears in the above-identified patent and that said Letters Patent is hereby corrected as shown below:

Title Page -

Insert the following related application data:

--Related U.S. Application Data

(62) CIP of application No. 11/129,242, filed on May 13, 2005.--.

Signed and Sealed this

Thirty-first Day of May, 2011

David J. Kappos
*Director of the United States Patent and Trademark Office*